United States Patent [19]

Williamson

[11] 3,782,488
[45] Jan. 1, 1974

[54] CONTROL SYSTEM FOR DIFFERENTIAL HYDROSTATIC STEERING

[75] Inventor: William A. Williamson, Niles, Mich.

[73] Assignee: Clark Equipment Company, Buchanan, Mich.

[22] Filed: Mar. 10, 1972

[21] Appl. No.: 233,495

[52] U.S. Cl. ................................ 180/6.48, 74/469
[51] Int. Cl. ............................................ B62d 11/04
[58] Field of Search .......................... 180/6.48, 6.3; 74/469

[56] References Cited
UNITED STATES PATENTS

| | | | |
|---|---|---|---|
| 2,941,609 | 6/1960 | Bowers et al. | 180/6.48 |
| 3,454,121 | 7/1969 | Toles | 180/6.48 |
| 3,581,497 | 6/1971 | Krumholz | 180/6.48 |

Primary Examiner—Leo Friaglia
Assistant Examiner—John A. Pekar
Attorney—Marmaduke A. Hobbs et al.

[57] ABSTRACT

A steering control system for a vehicle having a manual steering means such as a steering wheel and a dual path hydrostatic drive with separate motors for two steerable wheels, and separate variable output pumps for the motors in which a linkage interconnects the two motors. A pair of bars, preferably forming part of a parallelogram, controls and limits the movement of the linkage either in the same direction or in an angular direction to equalize the output of the motors or to vary the output of the motors to steer the vehicle. The movement of the interconnecting linkage is controlled by the steering means and the position of the two bars is preferably controlled by a foot pedal. Forward and reverse operation of the vehicle are obtained by shifting the linkage toward one or the other of the parallel members through the use of a resilient means, preferably a hydraulic motor. The present control system is particularly adapted for lift trucks in which the two front wheels are driven by the motors and a caster or casters are used for the rear wheels.

12 Claims, 6 Drawing Figures

CONTROL SYSTEM FOR DIFFERENTIAL HYDROSTATIC STEERING

The present invention relates to a mechanism or system for use with a vehicle having a drive wheel on each side of the vehicle driven by a separate hydraulic motor located at each wheel, the motors normally being driven by separate variable displacement fluid pumps which are used, not only to propel, but to steer the vehicle. Most control systems in use today fall into three general categories: namely, those controlled by two levers, those using a mechanism similar to bicycle handlebars in which the operator holds the handlebars with both hands and pushes them forwardly to travel forward and rotates the post on which the bars are mounted to turn the vehicle, and those having a T-handle which can be operated with one hand by the operator pushing the handle forward or back to travel and rotating it to turn the vehicle. All three of these types are dual path hydrostatic control systems which require special instruction, skills and practice to permit the operator to properly control the vehicle under all normal operating conditions.

Efforts have been made to adapt conventional automotive vehicle type of controls to the foregoing systems, wherein a wheel is used to steer the vehicle; however, in the past a number of problems have been encountered which rendered the wheel type systems impractical and/or unsafe. For example, if the system is arranged so that the operator has normal steering in the forward direction, he is likely to have reverse steering in the reverse direction, i.e. if he turns the wheel to the left to turn left while going forward, he will steer to the right if he turns the wheel to the left while going in reverse. Further, since the turn radius is a function of vehicle speed, if the operator is going straight forward at a relatively high speed and turns the wheel slightly he will start a particular radius of turn, then while holding the wheel in that position and slowing the vehicle down, the turn radius will decrease until the vehicle is stopped, at which point it is in center point steering. Thus, the operation of the vehicle is unpredictable or at least difficult to predict, and hence unsafe to operate. It is therefore one of the principal objects of the present invention to provide a steering and control system for dual path hydrostatic drives, in which the controls operate as a conventional automotive type having a steering wheel, a foot operated accelerating pedal and a control lever for forward and reverse directions, and which has the inherent ability to provide any type of steering response that may be desired under all normal operating conditions.

The dual hydrostatic transmissions are of particular advantage in lift trucks having a caster as the rear wheel, since they impart good maneuverability to the truck, including permitting turning on the center point between the drive wheels. In this type of system in a lift truck, if the two drive wheels are driven at the same rate, the truck will travel straight forward, and if one of the wheels is driven at a different rate of speed or in a different direction of rotation, the truck will turn, the difference in wheel speeds determining the rate of turn of the truck. The transmission systems on the trucks preferably include variable displacement type pumps, hence the wheel speed, and thus the truck speed, can be varied independently of engine speed. It is a further object of the invention to provide a drive and steering system for use in lift trucks, which gives effective control of the truck while utilizing maximum maneuverability of the hydrostatic system, and which can change the speed of the truck without affecting the turning radius of the truck.

Still another object of the invention is to provide a control system of the aforesaid type for lift trucks which utilizes the operational pattern of conventional automotive controls and which is capable of maintaining a constant steering rate regardless of the speed of the truck, and when the truck is not moving, permitting turning of the steering wheel without causing forward or rearward movement of the truck.

Further objects and advantages of the present invention will become apparent from the following description and accompanying drawings, wherein.

Figure 3:
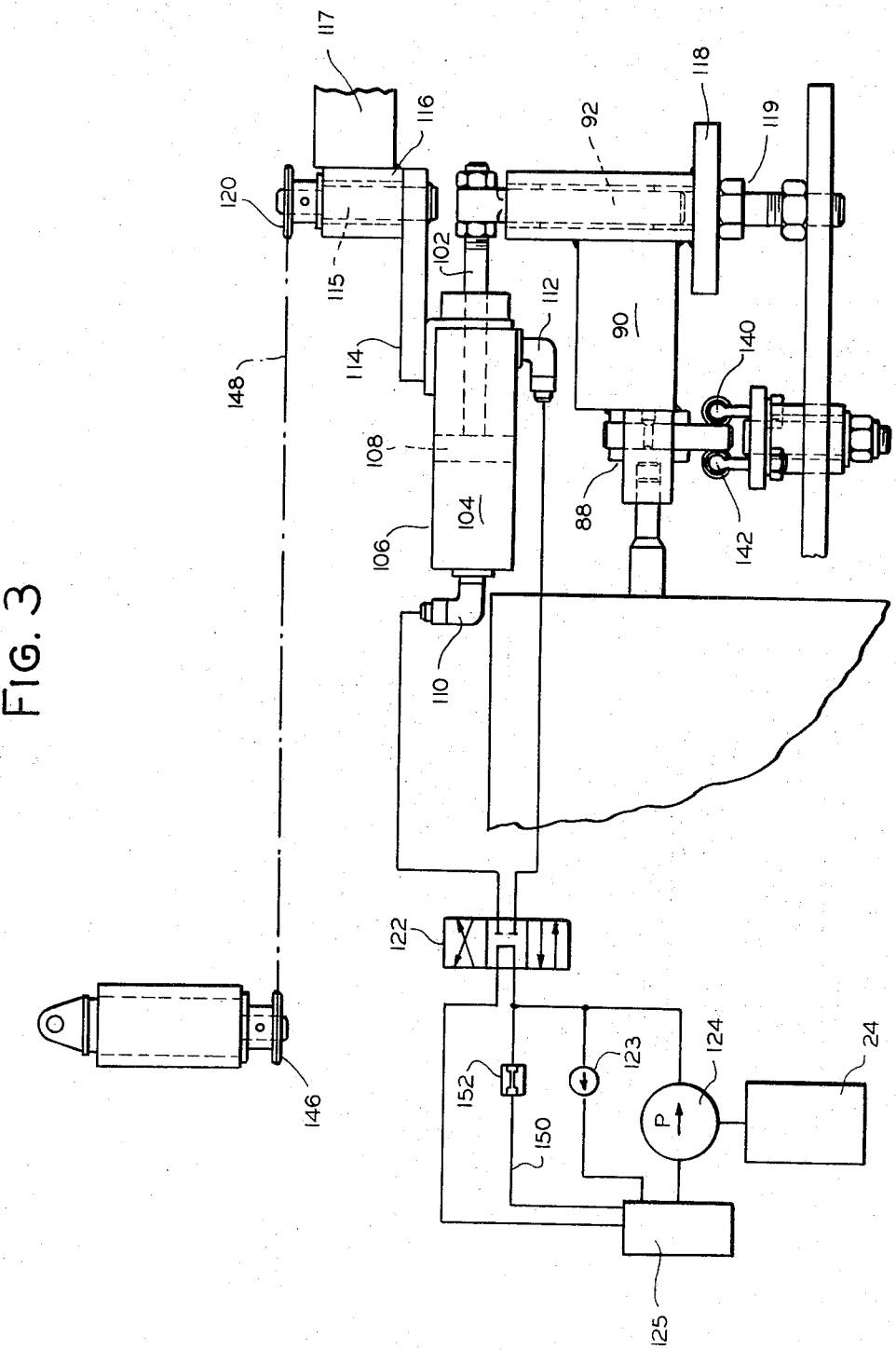
FIG. 3 is a side elevational view of the operating mechanism shown in FIG. 1, together with a schematic diagram of a portion of the hydraulic system.

Referring more specifically to the drawings, the present mechanism is designed for use on a number of different types of vehicles, but it is particularly adapted for use in connection with a dual hydrostatic system for lift trucks in which the two front wheels are driven by separate motors, which are in turn driven by hydraulic pumps of the variable capacity type. Various types of pumps and motors may be used in the dual path system indicated generally by numeral 10 in FIG. 1, for a lift truck having front wheels 12 and 14 driven by motors 16 and 18, respectively, the two motors being driven by variable displacement pumps 20 and 22, respectively. The pumps, in turn, are driven by the main engine of the vehicle, which is indicated by numeral 24 in FIG. 3. The two systems 28 and 30 of thee dual system 10 are identical in construction and operation, and hence like numerals will be given to like parts in the two systems but distinguished by prime markings on one.

Motor 16 is driven by pump 20 in one direction by fluid through line 32 and in the other direction by fluid through line 34, the pump being of the type which can be reversed to reverse the direction of motor 20. In order to maintain a predetermined minimum pressure in the lines so that the motor will be readily responsive to changes in the pump operation, a secondary hydraulic system indicated generally by numeral 40 supplies fluid under pressure from pump 42 through lines 44, 46 and 48 to check valves 50 and 52. The maximum pressure in the line is controlled by relief valve 54 in line 56 which is connected to lines 32 and 34 by line 58 having branches 60 and 62 in which are disposed check valves 64 and 66. The relief valve is connected to return line 68 which returns the fluid to a sump 70 from which the pump receives the fluid for maintaining the aforementioned predetermined pressure limits in the dual system. A check valve 72 is provided in return line 74 to prevent backflow of fluid in the line to the pump when valve 54 relieves the pressure in the respective subsystem. The numerals used herein have identified the sub-system 28 and the same numerals with primes designate like parts of the sub-system 30.

The pumps 20 and 22 which drive motors 16 and 18, respectively, include a swash plate controlled by rods 80 and 82 from mechanism generally indicated by numeral 84. The rods, being movable inwardly and outwardly of the pump body, vary the fluid displacement of pumps 20 and 22 by varying the angular position of the swash plate. By controlling the position of rods 80 and 82 through mechanism 84, the output of the two pumps is controlled either to maintain equal speed of motors 16 and 18, and hence obtain a straight forward or a straight rearward movement of the vehicle, or to obtain a differential in speed between the two motors and thereby turn the vehicle either to the right or left, depending on which motor is being driven at a greater speed.

The mechanism 84 includes a T-shaped member 88 having a stem 90 pivotally connected to a shaft 92, and a pair of parallel plates form a cross arm 94 interconnecting rods 80 and 82 and connected to the end of stem 90 opposite shaft 92, the ends of cross arm 94 having slots 96 therein which engage a pair of pins 98 and 100 connected to control rods 80 and 82, respectively. Shaft 92 is connected to the rod 102 of a double-acting fluid motor 104 which includes a cylinder 106 and a piston 108 slidably disposed within the cylinder and to which rod 102 is connected. A pair of ports 110 and 112 communicate with the interior of cylinder 106 at opposite ends thereof, and the fluid motor is supported by a bracket 114 which is attached to a shaft 115 mounted for rotation in a trunnion 116 which is supported in a fixed position by bracket or frame member 117. The forward end of the T-member has a plate 118 which rides or slides on an adjustable support means 119, and a sprocket 120 is fixed to the upper end of shaft 115. Thus, fluid motor 104 may be pivoted about shaft 116 between the position shown at 104 and the phantom outline position shown at 104'.

The ports 110 and 112 of fluid motor 104 are connected to a direction control valve 122 which is supplied with pressurized fluid from a pump 124 driven by vehicle engine 24. Valve 122 is operable so that fluid may be selectively directed to either one of ports 110 and 112 or simply returned to the fluid reservoir 125. Further, a relief valve 123 is disposed between pump 124 and valve 122 and is set at a relatively low setting so that the pressure fluid supplied to ports 110 and 112 is only about 25 psi. The fluid motor 104 acts as a liquid spring for biasing member 88 in a direction toward or away from pumps 20 and 22 and changes the output thereof accordingly.

Mechanism 84 includes a parallelogram linkage 130 which functions to limit the movement of pins 98 and 100, and hence controls rods 80 and 82. Linkage 130 includes a bar 132 and a bell crank 134 pivotally connected at 136 and 138, respectively. Connected in parallel relation between bar 132 and bell crank 134 are rods 140 and 142, and pins 98 and 100 extend between the rods and are limited in movement thereby. The bell crank 134 is connected by means of suitable linkage 143 to a foot-operated pedal 144 which operates parallelogram linkage 130 so that rods 140 and 142 are moved toward each other in opposition to fluid motor 104 operating through T-shaped member 88 and pins 98 and 100. Sprocket 120 is connected to another sprocket 146 by means of a chain 148, and the latter sprocket in turn is connected to a steering wheel (not shown). By rotating the steering wheel and the sprocket and chain connection, motor 104 is pivoted about shaft 115 between the extreme positions thereof shown in phantom.

Figure 1:
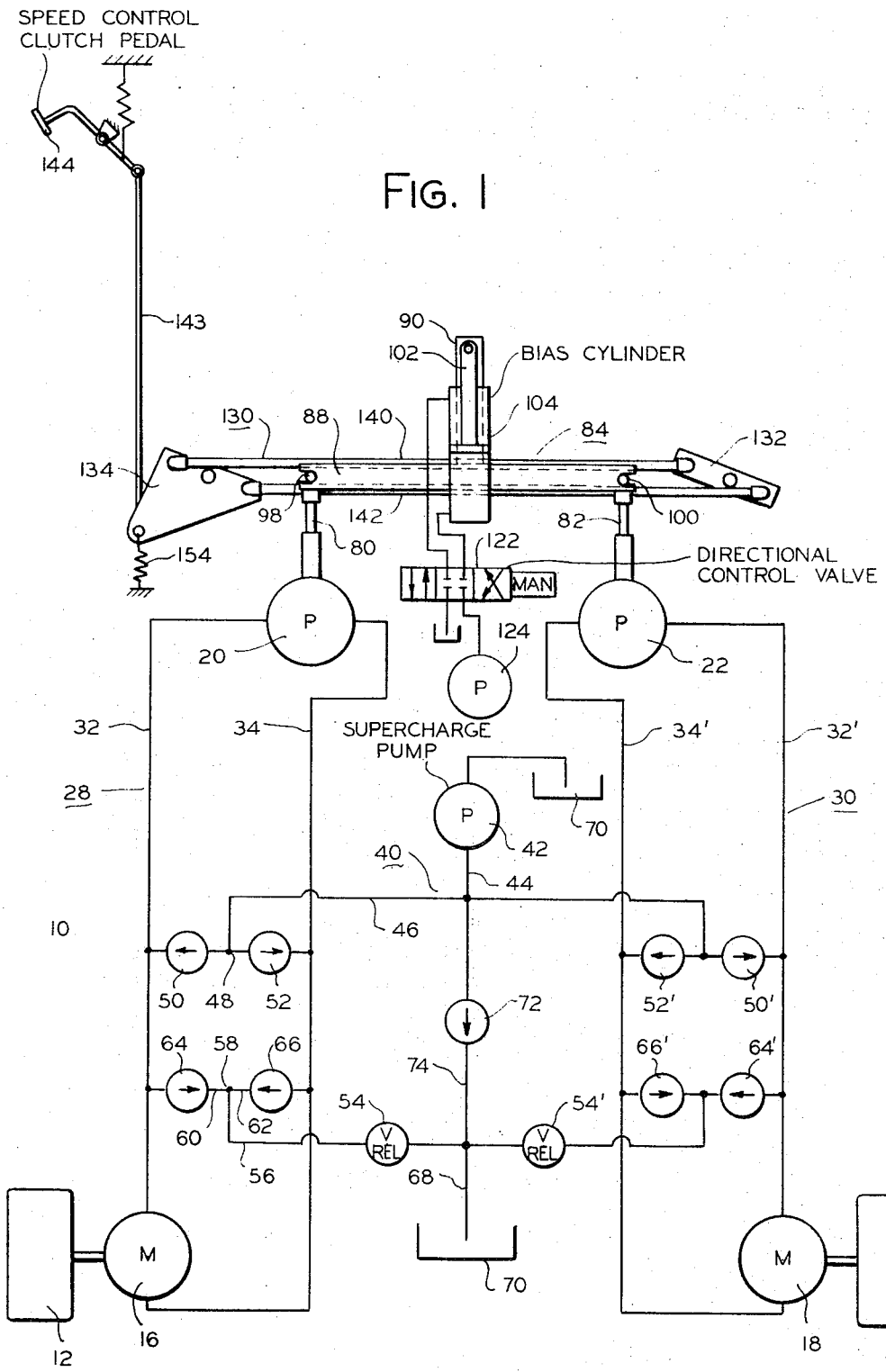
FIG. 1 is a schematic diagram of the present control system for differential hydrostatic steering, showing the system in one operating position.
Figure 2:
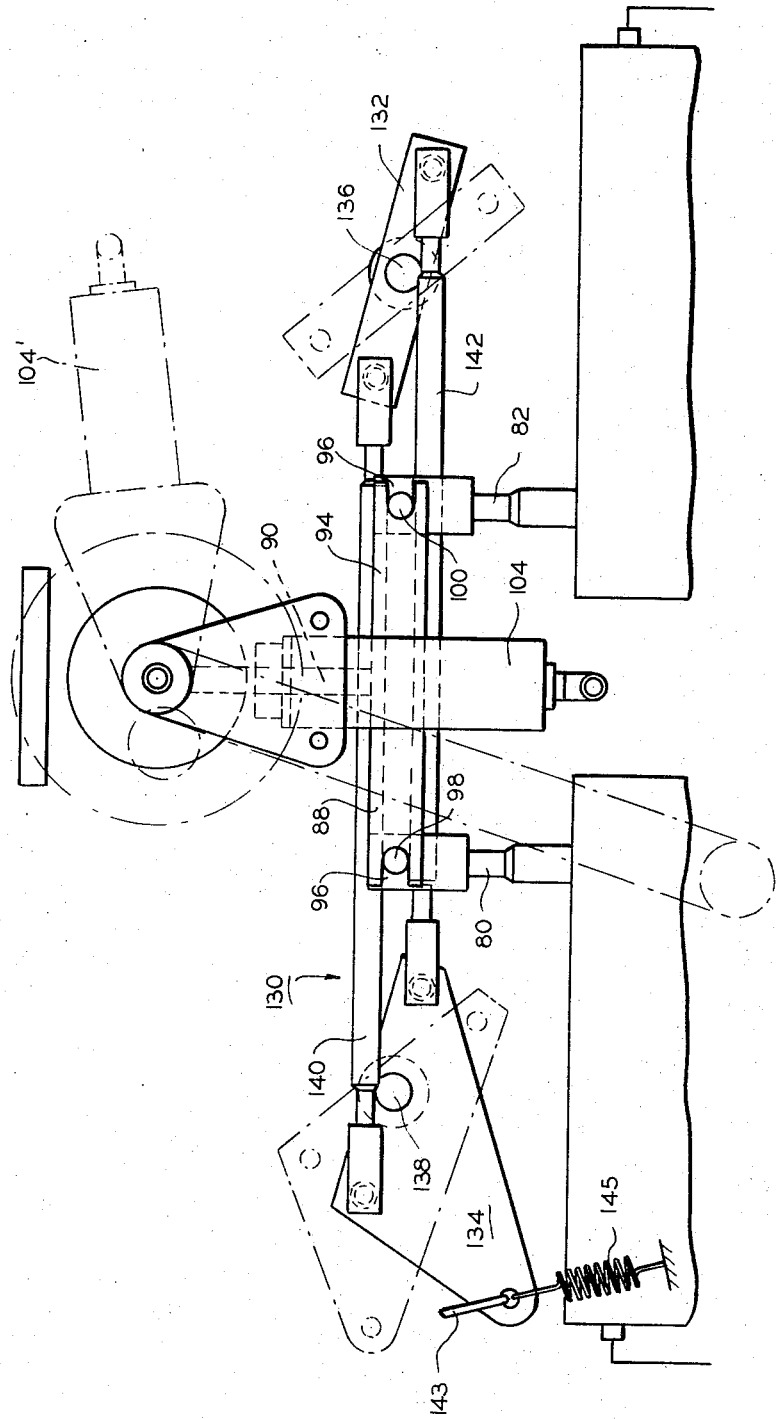
FIG. 2 is a plan view of the control system embodying a suitable mechanism for full control of a vehicle such as a lift truck, showing the mechanism in neutral position.
Figure 4:
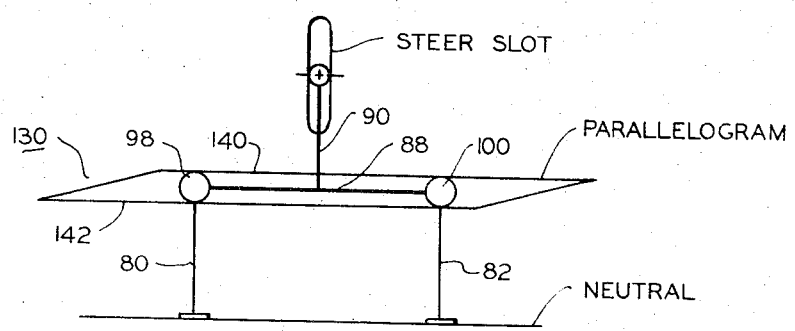
FIG. 4 is a diagram of the mechanism shown in FIGS. 1 and 2 showing the mechanism in neutral position.
Figure 5:
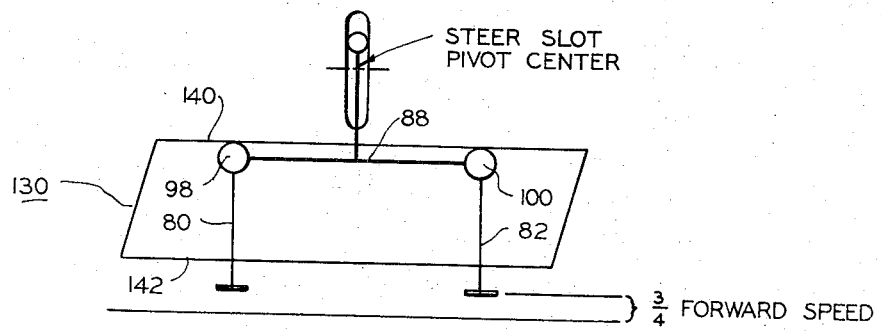
FIG. 5 is a diagram similar to that shown in FIG. 4, showing the mechanism in position for driving the vehicle forwardly.

In the operation of the present system, with the mechanism disposed as shown in FIGS. 1, 2 and 4, the variable displacement pumps 20 and 22 will be at their neutral position, and hence the vehicle will not move, since neither pump is generating pressurized fluid. When the operator manipulates valve 122 to select the forward direction, pressurized fluid is directed to port 110, thereby causing T-shaped member 88 to move upwardly as viewed in FIG. 2, with pins 98 and 100 seating against rod 140. Simultaneously, the operator controls the spacing between rods 140 and 142 by depressing the foot pedal connected to linkage 130 so that the linkage is maintained in the position shown in FIGS. 1, 2 and 4. When the foot pedal is released, linkage 130 is actuated by spring 145, fluid motor 104 through the T-shaped member 88, and pins 98 and 100, to move rods 140 and 142 away from each other, thereby allowing control rods 80 and 82 to extend to the limit determined by the position of pedal 144, since pins 98 and 100 follow in engagement with rod 140, in that fluid motor 104 is exerting a bias on T-shaped member 88. Since the bias of fluid motor 104 is being supplied along a line parallel with rods 80 and 82, the two rods will move out together, with the result that the vehicle will be driven forwardly along a straight line. In order to drive the vehicle in a reverse direction, it is simply necessary to actuate control valve 122 so that pressurized fluid is directed to port 112, thereby biasing member 88 in the direction to engage pins 98 and 100 against rod 142.

Figure 6:
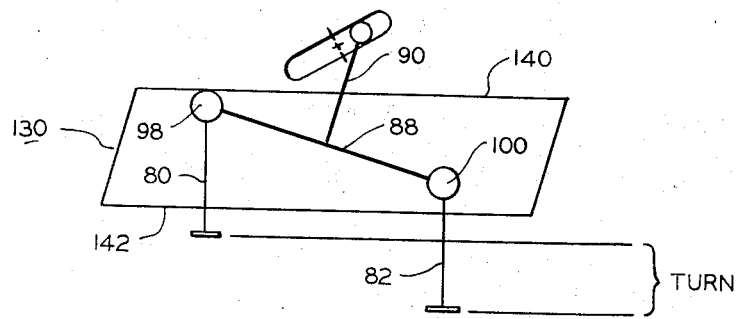
FIG. 6 is a diagram similar to those shown in FIGS. 4 and 5, illustrating the position of the mechanism when the vehicle is being turned to the right.

To steer the vehicle, a differential in speed between wheels 12 and 14 is created by moving the T-shaped member 88 to an angular position by manipulating the steering mechanism. For example, the vehicle may be steered by slowing down the speed of the motor on the side of the vehicle in the direction toward which it is desired to turn the vehicle. If it is desired to turn the vehicle toward the right while it is proceeding forwardly, assuming that forward is toward the top of the drawing as viewed in FIGS. 1, 2 and 6, pump 22 will be operated so that the displacement thereof is decreased, thereby slowing down motor 18 and wheel 14 associated with the pump and motor.

If the vehicle is proceeding in a straight line in a forward direction, member 88 is biased toward the top of the drawing and linkage 130 has been actuated so that bar 140 has been moved toward the top of the drawing, with the result that rods 80 and 82 are extending out of the bodies of the respective pumps 20 and 22. When making a left turn, the steering control wheel is actuated so that fluid motor 104 is pivoted in a counterclockwise direction about shaft 115, thus causing member 88 to cock so that the left end of arm 94 is lowered, the right end of arm 94 maintaining its position against rod 140. As a result control rod 80 is moved back into the body of pump 20 which decreases the displacement of the pump and thus slows down the wheel on the left side of the vehicle so that the vehicle turns toward the left.

Actuation of linkage 130 to move the rods 140 and 142 away from each other permits the control rods 80 and 82 to move inwardly or outwardly, depending upon the bias imposed on T-shaped member 88 by fluid motor 104. To increase the speed of the vehicle, movement of control rods 140 and 142 toward or away from each other changes the speed ratio between engine 24 and the wheels, since the engine is the source of power for driving the pumps and indirectly wheels 12 and 14; therefore, it may be necessary to accelerate the vehicle engine as linkage 130 is operated to move rods 140 and 142 away from each other, to prevent the engine from stalling, or to maintain adequate power at the wheels to drive the vehicle at the desired speed.

The mechanism may be modified to provide in effect an automatic drive train by adding a line 150 between valve 122 and pump 124 with a restriction 152 therein, and by utilizing a spring 154 connected to bell crank 134 to bias linkage 130 to the position shown in FIG. 1 of the drawings. With this modified system, the operator merely manipulates valve 122 to select either forward or reverse direction and then accelerates engine 24. The restriction 152, due to the variable output of pump 124, provides a variable bias through fluid motor 104 so that, as engine speed is increased, the bias on member 88 is increased andd causes control rods 80 and 82 to move further inwardly or outwardly, thereby increasing the speed of the vehicle in a forward or reverse direction, in accordance with the power output of the engine.

While only one embodiment of the control system and one modification thereof have been described herein, various other changes and modifications may be made without departing from the scope of the invention.

I claim:

1. A steering control system for a vehicle having a steering means and a dual path hydrostatic drive with separate motors for two steerable wheels and separate variable output pumps for said motors: comprising a means for controlling the output of each of said pumps, a longitudinal member interconnecting said pump control means and being mounted for angular movement transversely of its longitudinal axis for operating said control means, a linkage having two parallel members movable to various spaced relationships to one another for controlling the position of the two ends of said longitudinal member and said pump control means to control the output of said pumps relative to one another, means for urging said longitudinal member toward one of said parallel members to obtain forward travel of the vehicle and toward the other of said parallel members to obtain rearward travel of the vehicle, means for connecting said member to the steering means for varying the angular position of said member on its transverse axis to vary the output of one pump relative to the other pump, and means for varying the spacing between said parallel members.

2. A steering control system for a vehicle as defined in claim 1 in which members connect the ends of said two parallel members to form a parallelogram.

3. A steering control system for a vehicle as defined in claim 2 in which a manually operated member is connected to one member of said parallelogram to vary the spacing between said two parallel members.

4. A steering control system for a vehicle as defined in claim 3 in which said manually operated means consists of a foot-operated pedal.

5. A steering control system for a vehicle as defined in claim 1 in which a manually operated member moves said parallel members toward one another for controlling the output of the pumps relative to one another.

6. A steering control system for a vehicle as defined in claim 5 having a steering wheel in which a member is connected angularly to said longitudinal member and a linkage connects said steering wheel with said angularly positioned member for moving said bar to various angular positions.

7. A steering control system for a vehicle as defined in claim 1 in which said means for urging said longitudinal member toward one or the other of said parallel members applies a yieldable force to said member for resiliently urging said member.

8. A steering control system for a vehicle as defined in claim 7 in which said means for urging said longitudinal member toward one or the other of said parallel members consists of a hydraulic motor and a valve for controlling said motor to vary the direction of movement of said member toward one or the other of said spaced members.

9. A steering control system for a vehicle having a manual steering means as defined in claim 8 in which a member is connected angularly to said longitudinal member and a linkage connects said steering means with said angularly positioned member for moving said member to various angular positions.

10. A steering control system for a vehicle having a manual steering means as defined in claim 1 in which a member is connected angularly to said longitudinal member and a linkage connects said steering means with said angularly positioned member for moving said bar to various angular positions.

11. A steering control system for a vehicle as defined in claim 1 in which a member rigidly connected to said longitudinal member at right angles connects said steering means to said member for urging one end or the other of said longitudinal member toward one or the other of said parallel members.

12. A steering control system for a vehicle as defined in claim 11 in which said means for urging said longitudinal member toward one or the other of said parallel members consists of a hydraulic motor connected to said right angle positioned member.

* * * * *